J. C. LINCOLN.
METHOD OF CAST WELDING ELECTRIC BONDS.
APPLICATION FILED AUG. 9, 1913.

1,183,992.

Patented May 23, 1916.

Witnesses:
F. Griswold.
R. R. Curtis.

Inventor
John C. Lincoln
by Albert Lynn Lawrence
Attorney

UNITED STATES PATENT OFFICE.

JOHN C. LINCOLN, OF CLEVELAND, OHIO.

METHOD OF CAST-WELDING ELECTRIC BONDS.

1,183,992.  Specification of Letters Patent.  Patented May 23, 1916.

Application filed August 9, 1913. Serial No. 783,973.

*To all whom it may concern:*

Be it known that I, JOHN C. LINCOLN, a citizen of the United States, residing at Cleveland, in the county of Cuyahoga and State of Ohio, have invented certain new and useful Improvements in Methods of Cast-Welding Electric Bonds, of which the following is a specification.

My invention relates to an improved method of cast-welding electric bonds upon rail joints, and has for its object the provision of a simple, cheap and efficient method for bonding rails.

My said improvements contemplate the sectional fusion in position, of a suitable electric bond in connection with the respective rail ends, and ordinarily supplying to the bond at the time of fusion, sufficient conductive material to insure adequate electrical conductivity, between the rails and the bond.

Preferably the electrical bond comprises laminæ of copper which are united in U-shaped form, with their ends banded or otherwise secured together, in order to distribute the flexing strains incidental to the use of the electric bond. The practice of my invention, ordinarily proceeds in a carbon mold or carbon lined mold, which contains the ends of the bond, held closely adjacent to the respective ends of the rails. An electric arc, or other suitable heating means, is employed to cast-weld the bond directly to the body of the rail, and whenever necessary, a sufficient additional amount of the bonding material is cast-welded in position to afford adequate electrical connection with the rails.

My invention may be more readily explained by making reference to the accompanying drawings, wherein:—

Figure 1:
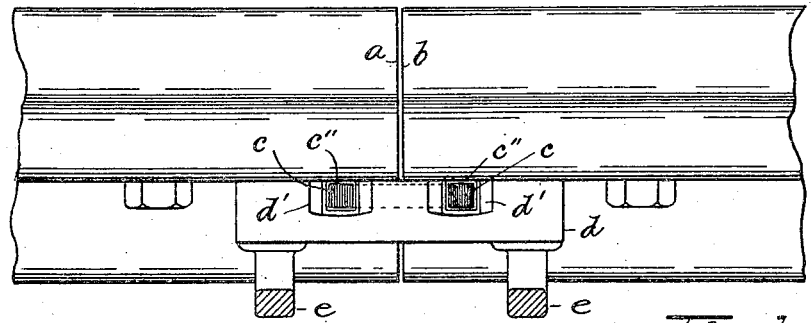
Figure 2:
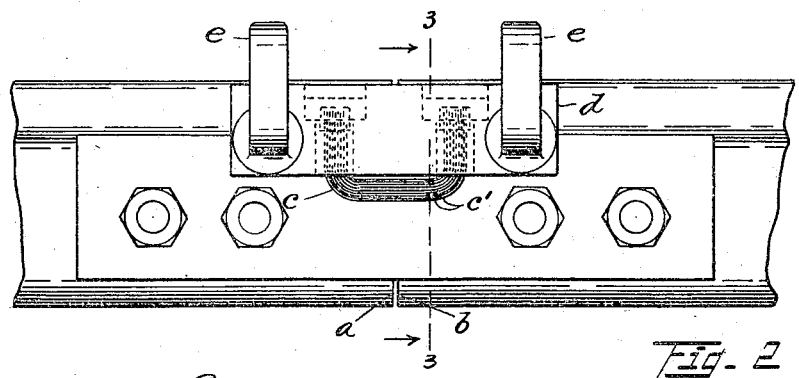
Figure 3:
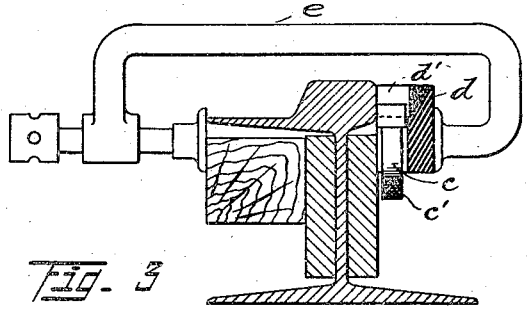
Figure 4:
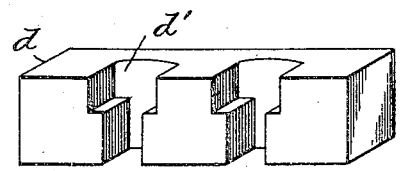
Figure 6:
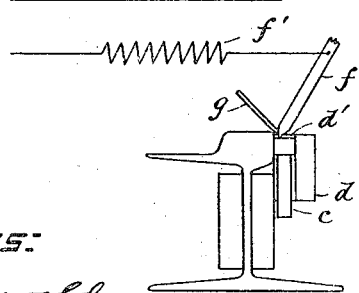
Figure 5:
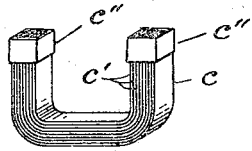

Figure 1 is a fragmentary top view of two rail ends, illustrating the mold and bond in position thereon. Fig. 2 is a side elevation thereof. Fig. 3 is a transverse section on line 3—3 of Fig. 2. Fig. 4 is a perspective view of a carbon mold for practising my invention. Fig. 5 illustrates the preferred type of bond, and Fig. 6 is merely a diagrammatic view to indicate the preferred mode of practising my invention.

Throughout the several figures of the drawings, I have employed the same character of reference to indicate similar parts.

In ordinary practice, the operating current for the trolley railway affords the most accessible source of power and consequently, the heat requisite for affixing the electrical bond. The usual mode of accomplishing this result previously, has involved the employment of a rotary converter for generating alternating currents of high amperage and directly heating the bonding and brazing material by the passage of such currents, to effect a braze upon the rail-ends and insure their electrical union. My invention proceeds along the lines of highly heating both the steel of the rail-ends and the bond to secure surface fusion therebetween; preferably by the arc of a direct current circuit from any convenient or suitable source, such as the trolley circuit or a rotary converter, whereby approximately ten per cent. of the electric energy required by the former method will serve to effect a cast-weld within a suitable mold. In the present method, the flow of current through the bond and rail is only incidental to one mode of practising my invention, simply for the purpose of producing the fusion by means of the electric arc. This comprises the more usual method employed. Accordingly, I will describe my improvement, as practised in the manner just outlined.

Referring to the drawings, $a$, $b$, are the ends of the rails which are to be electrically united. Adjacent to the outer heads thereof, and bridging the slight interval between the rails, there is positioned an electric bond $c$, formed of copper laminæ $c'$, with their ends bent to U-shape and connected by encircling bands $c''$, as best shown in Fig. 5. A carbon mold $d$ is secured to the rail ends by means of clamps $e$. This mold is provided with expanded, bottomless recesses $d'$, which are adapted to receive the ends of the copper bond, while protecting the body thereof against excessive heat, as shown in the drawings.

It will be understood that my invention is neither restricted to the details of means nor manner of practising the same. However, I may explain that the bond may be formed of copper strips varying in thickness from 1/64″ to 1/32″, and in width from 1/4″ to 1/2″. The ends of the laminæ may be united by a copper band of 1/2″ in width, and when the bond is inserted within the recesses of the mold, these banded ends project from 1/16″ to 3/16″ above the bottom walls of the expanded portions. Referring to the diagram, Fig. 6, the carbon $f$ should be understood to be in connection with the trolley conductor, or other source of current, through the resistance $f'$. The current ordinarily used, varies from one hundred to two hundred amperes, depending upon the size of the bond and the rapidity with which it is desired to make the weld. The positive electrical connection comprises the electric bond and the rail.

Having adjusted the parts, as described and shown, carbon $f$ is applied to one end of the bond within its recess $d'$ and the electric arc is struck between said carbon and the bond, or the inclosed portion of the rail, serving to fuse the surface of the rail and melt down the copper within the recess of the mold.

The operative is provided with a dark glass screen, wherewith to observe the progress of fusion and the condition of the fused metals. As soon as the end of the bond has been thoroughly fused to the rail, the end of a copper rod $g$ may be inserted into the recess $d'$, and sufficient copper may be melted therefrom by the arc and cast-welded to the surface of the rail by the same means, in order to provide an adequate head or conductive connection between the bond and the rail. In practice it will be found that the copper fused in this manner, often becomes somewhat porous and the operative by watching, is enabled to judge of this condition, and provide a sufficient conductive body or head for the bond to afford adequate electrical connection with the rail. It will also be observed that only a small section of the rail head is subjected to the arc and fused thereby, in connection with the bond and added copper, so that the wearing qualities of the rail are unaffected by the localized heat to which it is subjected.

A single carbon mold preferably is employed for practising my method, since the molten copper tends to occlude oxygen, and the carbon, moreover, maintains the cast-welded metal in a bright and pure condition. Upon breaking one of the cast-welded connections, it will be found that the molten steel and copper have united over a slightly irregular surface, and portions of the steel frequently may be broken away with the copper bond, upon applying sufficient force thereto. Nevertheless, the method of cast-welding these bonds is sufficient to afford permanent electrical and mechanical connection between the rails and bond, throughout the life of the former.

Quite obviously, sufficient heat may be applied to the bond and rail by the oxy-acetylene or the oxy-hydrogen flame, for example, although the negative terminal of the electric arc more commonly is preferable for this purpose. It will be observed that the heating of the bond itself causes early fusion of a small section of each terminal directly upon its associated rail-ends, and by adding molten bonding material to form the conductive heads cast-welded upon the bond and rail-ends, said heads are thus fused directly to the terminals of the bond and to the rail-ends, before they have had time to cool appreciably. In other words, the cast-welding operation proceeds from the bottom wall of the expanded recess in the mold, and permits fused metal to be added to the body previously fused therein, and before the latter has cooled sufficiently to permit hardening. In this way, only the surface of the head and the adjacent section of the rail need be maintained in a state of fusion. The bond itself, moreover, is protected from excessive heat, and the laminæ remain unfused for some distance within the jacket as further described in my copending application, Serial No. 83,996 filed March 13, 1916, hence any flexing strains are distributed by the closely encircling jacket or sleeve.

It will be observed that the method described, involves the use of any suitable heating-flame for fusing the terminals of the bond directly to the rail-ends and avoids the use of a brazing-material or the heating of the bond by flowing and casting molten metal about the terminals thereof. Accordingly, I have adopted "heating-flame" as a distinctive generic term in the claims, to indicate any suitable flame, whether produced by ignition, such as an oxy-hydrogen or an oxy-acetylene flame, for example, or by the voltaic-arc.

Having now described the preferred method and means for practising my invention, I claim as new and desire to secure by Letters Patent, the following:—

1. The herein-described method for applying a bond to rail-ends, which consists in positioning a mold adjacent to said rail-ends, disposing the conductive bond interiorly of said mold and applying a heating-flame locally to the rail-ends and bond to secure surface fusion therebetween interiorly of the mold, substantially as set forth.

2. The herein-described method for applying a bond to rail-ends, which consists in positioning a mold adjacent to said rail-ends, disposing the conductive bond interiorly of said mold and applying the terminal of an electric arc to the rail-ends and to the bond to produce sufficient heat locally to effect the fusion respectively between the rail-ends and the bond, substantially as set forth.

3. The herein-described method for applying a bond to rail-ends, which consists in positioning a mold adjacent to said rail ends, disposing the conductive bond interiorly of said mold, applying the terminal of an electric arc to the rail-ends and to the bond to produce sufficient heat locally to effect the fusion respectively between the rail-ends and the bond, and adding sufficient conductive material during the process of fusion to insure adequate electrical conductivity between said rail-ends and the bond, substantially as set forth.

4. The herein-described method of applying bonds to rail-ends, which consists in applying a mold having carbon-faced recesses to the rail-ends, disposing the conductive bond interiorly of said mold with its ends protruding into said recesses, and applying a heating-flame locally to the rail-ends and the terminals of the bond sufficiently to produce fusion of the metals and cast-weld said bond upon the respective rail ends, substantially as set forth.

5. The herein-described method of applying bonds to rail-ends, which consists in applying a mold having carbon-faced recesses to the rail-ends, disposing the conductive bond interiorly of said mold with its ends protruding into said recesses, applying a heating-flame locally to the rail-ends and the terminals of the bond sufficiently to produce fusion of the metals and supplying to the fused terminals of the bond additional conductive materials in molten condition to insure adequate electrical connection between the rail-ends and the bond, substantially as set forth.

6. The herein-described method of applying bonds to rail-ends, which consists in applying a mold having carbon-faced recesses to the rail-ends, disposing the conductive bond interiorly of said mold with its ends protruding into said recesses, and applying the negative terminal of an electric arc locally to the rail-ends and to the terminals of the bond, whereby they are respectively fused over sufficient conductive areas, substantially as set forth.

7. A method for bonding rails, consisting in applying a recessed mold to the rail-ends, disposing the terminals of a laminated conductive bond within the recesses of the mold, applying a heating-flame locally to the rail-ends and terminals of the bond sufficient to produce fusion thereof, and subjecting a body of metal to said heating-flame to melt therefrom additional conductive heads directly upon the terminals of the bond and the rail-ends, substantially as set forth.

8. A method for bonding rails, consisting in superposing a plurality of metal laminæ, bending the ends thereof, closely banding the terminals and adjacent body portions, protecting the body portions against excessive heat, and fusing the terminals of said strips for a short distance within the band, directly to the respective rail-ends, substantially as set forth.

9. A method for bonding rails, consisting in applying to the rail-ends a carbon mold having separate partial recesses facing said rail-ends, inserting the ends of a plurality of superposed metal laminæ within said recesses, applying the terminal of an electric arc locally to the inclosed portions of the rail-ends and laminæ, and submitting additional bonding-metal to the electric arc while the rail-ends and laminæ are in molten condition, to cast conductive heads upon the rail-ends and the bond thus formed, substantially as set forth.

In testimony whereof I do now affix my signature in the presence of two witnesses.

JOHN C. LINCOLN.

Witnesses:
A. C. KNIGHT,
ALBERT LYNN LAWRENCE.